US009120701B2

(12) United States Patent
Amritphale et al.

(10) Patent No.: US 9,120,701 B2
(45) Date of Patent: Sep. 1, 2015

(54) COMPOSITION FOR ADVANCED HYBRID GEOPOLYMERIC FUNCTIONAL MATERIALS AND A PROCESS FOR THE PREPARATION THEREOF

(71) Applicant: COUNCIL OF SCIENTIFIC & INDUSTRIAL RESEARCH, New Delhi (IN)

(72) Inventors: Sudhir Sitaram Amritphale, Bhopal (IN); Deepti Mishra, Bhopal (IN); Ramesh Kumar Chouhan, Bhopal (IN); Manish Mudgal, Bhopal (IN); Mohammed Akram Khan, Bhopal (IN); Swati Lahiri, Bhopal (IN); Navin Chandra, Bhopal (IN); Barada Kanta Mishra, Bhopal (IN)

(73) Assignee: COUNCIL OF SCIENTIFIC & INDUSTRIAL RESEARCH, New Delhi (IN)

(*) Notice: Subject to any disclaimer, the term of this patent is extended or adjusted under 35 U.S.C. 154(b) by 0 days.

(21) Appl. No.: 13/949,585

(22) Filed: Jul. 24, 2013

(65) Prior Publication Data

US 2014/0026787 A1     Jan. 30, 2014

(30) Foreign Application Priority Data

Jul. 25, 2012    (IN) ........................... 2301/DEL/2012

(51) Int. Cl.
     *C04B 24/00*      (2006.01)
     *C04B 22/00*      (2006.01)
     *C04B 22/06*      (2006.01)
     *C04B 28/00*      (2006.01)

(52) U.S. Cl.
CPC ........... *C04B 22/0006* (2013.01); *C04B 22/062* (2013.01); *C04B 24/001* (2013.01); *C04B 28/006* (2013.01); *Y02W 30/92* (2015.05); *Y02W 30/93* (2015.05); *Y02W 30/97* (2015.05)

(58) Field of Classification Search
CPC .. C04B 22/006; C04B 22/062; C04B 28/006; C04B 24/001; C04B 18/08; C04B 18/12; C04B 18/248; Y02W 30/92; Y02W 30/93; Y02W 30/97
USPC .......................................... 106/705, 708, 697
See application file for complete search history.

(56) References Cited

U.S. PATENT DOCUMENTS 4,964,995 A    10/1990   Chum et al.
5,244,726 A     9/1993   Laney et al.
5,490,889 A *   2/1996   Kirkpatrick et al. .......... 106/709
5,997,632 A *   12/1999   Styron ........................... 106/705

2010/0071597 A1*   3/2010   Perez-Pena ................... 106/708
2011/0271876 A1    11/2011   Alter et al.
2011/0284223 A1    11/2011   Porcherie et al.

OTHER PUBLICATIONS

Aleem, M.I. Abdul, et al., Geopolymer Concrete-A Review, Int J Engin Sci.& Emerging Technol., Feb. 2012, ISSN:2231-6604, vol. 1, Issue 2, pp. 118-122.
Abdullah, M.M.A, et al., Mechanism and Chemical Reaction of Fly Ash Geopolymer Cement-A Review, Int. J. Pur Appl. Sci. Technol., vol. 6, Issue 1, 2011, ISSN 2229-6107, pp. 35-44.
Fansuri, H., et al., The effect of sodium silicate and sodium hydroxide on the strength of aggregates made from coal fly ash using the geopolymerisation method, Aug. 23, 2010, Asia-Pacific Journal of Chem Engin, vol. 7, Issue 1, pp. 73-79, 2012.
Rees, C., et al., The Role of Solid Silicates on the Formation of Geopolymers Derived from Coal Ash, Int Symp. of Resarch Students on Material Sci. and Engin., Dec. 20-22, 2004, Chennai, India.
Laine, R.M., et al., Synthesis of Pentacoordinate Silicon Complexes from SiO2, Letters to Nature, vol. 353, Oct. 17, 1991, pp. 642-644.
Kalikhman, i, et al., Penta- and Hexacoordinate Silicon Mixed Dichelates with the SiC2O2N(CI) Ligand Environment, ARKIVOC 2006, ISSN 1424-6376, pp. 63-77.
Rovnanik, P., Influence of C12A7 Admixture of Setting Properties of Fly Geopolymer, Ceramics—Silikaty, vol. 54, Issue 4, pp. 362-367, 2010.
Duxson, P., et al., Understanding the Relationship Between Geopolymer Composition, Microstructure Properties, Colloids and Surfaces A: Physicochemical and Engineering Aspects, vol. 269, issues 1-3, Nov. 1, 2005, pp. 47-58.

(Continued)

*Primary Examiner* — Anthony J Green
(74) *Attorney, Agent, or Firm* — Hudak, Shunk & Farine Co. LPA

(57) ABSTRACT

The present invention provides a composition for advanced hybrid geopolymeric functional materials possessing very broad application spectrum ranging from cementitious materials to advanced functional materials having "Inorganic-Organic Hybrid" matrix in contrast to the limited application of conventional geopolymeric materials having "Inorganic matrix" only. The invention further relates to a process for the preparation of these materials. The process obviates the need of external addition of sodium silicate which is one of the costliest and main raw materials in conventional geopolymerisation processes. Interestingly, in the present invention the sodium silicate has been synthesized in situ by designing of conditions for synergistic and simultaneous mechanochemical reactions among the selected raw materials viz. inorganic and organic wastes under alkaline environment. This results in the formation of "Hybrid inorganic-organic frame work" of sodium silicate, which facilitates uniform dispersion of reacting species, thus resulting in the formation of homogeneous geopolymeric matrix with improved characteristics.

11 Claims, No Drawings

(56) References Cited

OTHER PUBLICATIONS

Dimas, D., et al., Polymerization in Sodium Silicate Solutions: a Fundamental Process in Geopolymerization Technology, J Mater Sci, 2009, vol. 44, pp. 3719-3730, DOI 10.1007/s10853-009-3497-5.
http://www.dcmsme.gov.in/reports/ProjectProfileonSodium_Silicate.html, cite belongs to the Office of Development Commissioner (MSME), Ministry of Micro, Small & Medium Enterprises, Government of India.
Luduena, L, et al., Nanocellulose from Rice Husk Following Alkaline Treatment to Remove Silica, BioResources, 6 (2), Luduena et al, 2011, pp. 1440-1453.
De Souza, M.F., et al., Silica Derived from Burned Rice Hulls, Materials Research, vol. 5, No. 4, pp. 467-474, 2002.
Qu, Y, et al., A Novel Mesoporous Lignin/Silica Hybrid From Rice Husk Produced by a Sol-Gel Method, Follow Bioresources Technology, vol. 101, No. 21, Elsevier, Nov. 1, 2010.
Abdullah, M.M.A.B, et al., Fly Ash Porous Material Using Geopolymerization Process for High Temperature Exposure, Int. J. Mol. Sci., 2012, vol. 13, pp. 4388-4395, DOI:10.3390/ijms13044388, ISSN 1422-0067.
Komljenovic, M, et al., Mechanical and Microstructural Properties of Alkali-activated Fly Ash Geopolymers, Journal of Hazardous Materials, vol. 181, 2010, Elsevier, pp. 35-42.
Criado, M., et al., Alkali Activated Fly Ash: Effect of Admixtures on Paste Rheology, Rheol Acta, 2009, vol. 48, pp. 447-455, DOI 10.1007/s00397-008-0345-5, Springer.

* cited by examiner

COMPOSITION FOR ADVANCED HYBRID GEOPOLYMERIC FUNCTIONAL MATERIALS AND A PROCESS FOR THE PREPARATION THEREOF

FIELD OF INVENTION

The present invention relates to a composition for advanced hybrid geopolymeric functional materials and a process for the preparation thereof. In particular, the present invention provides novel green cementitious materials prepared from waste materials. The invention further relates to designing of conditions for simultaneous mechano-chemical reactions among the selected raw materials for "in-situ" synthesis of the various indispensible reactants possessing appropriate chemical linkages as a result of synergistic action among them, which are necessarily required to act as precursors for making advanced hybrid polymeric substrate materials useful for multifarious applications. The developed advanced hybrid polymeric substrate materials have very broad application spectrum ranging from cementitious materials to advanced functional materials.

BACKGROUND OF INVENTION AND DESCRIPTION OF PRIOR ART

The cement industry does not fit the contemporary picture of a sustainable industry because it uses raw materials and energy that are non-renewable; extracts its raw materials by mining and manufactures a product that cannot be recycled. Through waste management and by utilizing the waste by-products from thermal power plants, fertiliser units and steel factories, energy used in the production can be considerably reduced. This cuts energy bills, raw material costs as well as green house gas emissions. In the process, it can turn abundantly available wastes, such as fly ash and slag into valuable products, such as geopolymeric concretes.

'Geopolymer cement concretes' (GPCC) are Inorganic polymer composites, which are prospective concretes with the potential to form a substantial element of an environmentally sustainable construction by replacing/supplementing the conventional concretes. GPCC have high strength, with good resistance to chloride penetration, acid attack, etc. These are commonly formed by alkali activation of industrial waste materials such as Fly Ash [FA] and Ground Granulated Blast Furnace Slag [GGBS], and have a very small Greenhouse footprint when compared to traditional concretes.

Recently, the incorporation of industrial and agricultural wastes in cement and concrete has gained considerable importance because of the requirement of environmental safety and more durable construction in the future.

Reference may be made to the article "Geopolymer Concrete—A Review" authored by M. I. Abdul Aleem and P. D. Arumairaj; International Journal of Engineering Sciences & Emerging Technologies, February 2012, Volume 1, Issue 2, pp: 118-122, wherein it is reported that in the conventional process of making geopolymeric materials, essentially three major constituents are required which are—(i) silicon and aluminium containing raw materials/wastes (ii) aqueous alkali hydroxide solutions like NaOH/KOH etc. (iii) sodium silicates/potassium silicates. The drawbacks of this process are: a) one of the reactants, namely sodium silicate (generally called as activator/activating solution in geopolymeric system) is viscous, which limits its dispersion and homogenization to desirable extent and b) as it essentially posses "inorganic frame work" only, its reactivity with other raw materials is restricted to considerable extent and c) it is costliest raw material in the externally added geopolymer reaction system.

Reference may be made to the article—Mechanism and Chemical Reaction of Fly Ash, Geopolymer Cement—A Review, authored by M. M. A. Abdullah, K. Hussin, M. Bnhussain, K. N. Ismail and W. M. W. Ibrahim; *Int. J. Pure and Appl. Sci. Technol.,* 6 (1), (2011), pp. 35-44, wherein it is reported that the in-depth understanding of the chemical reactions taking place among the various reactants is necessary. The alkaline activator (sodium silicate) plays an important role as it is necessary for making geopolymeric materials. However, the drawbacks are that sodium silicate is always added externally in the conventional process of making geopolymers, which is a very costly chemical, and has inherent disadvantages as aforesaid.

Reference may be made to the article—The Effect of Sodium Silicate and Sodium Hydroxide on the Strength of Aggregates Made from Coal Fly Ash using the Geopolymerisation Method, Hamzah Fansuri, Didik Prasetyoko Zezhi' Zhang and Dong-ke Zhang, *Asia-Pac J. Chem. Eng.,* 7, 73-79, 2012, wherein it is reported that geopolymers have been made using fly ash and sodium hydroxide and sodium silicate solution. Further it is reported that the strength of geopolymers increases with increase in sodium hydroxide solution concentration, but the strength decreases beyond optimum concentration of sodium silicate solution. However, the process suffers from the drawback of requiring sodium silicate to be added externally.

Reference may be made to the article—The role of solid silicates on the formation of geopolymers derived from coal ash". International Symposium of Research Students on Material Science and Engineering, Dec. 20-22, 2004, Chemai, India, page 1-13 wherein it is reported that the mechanism of geopolymerization clearly brings out that every reactant has its specific role. Further the activation potential of sodium silicate in comparison to other activators like potassium silicate and sodium hydroxide is relatively more and is based on the fact that sodium silicate already contains dissolved and partially polymerized sodium in the hydroxylated form as NaOH and silica in the form of ≡Si—OH. Both these species are in a very reactive form and therefore it reacts easily with siliceous and aluminous species of the raw materials e.g. fly ash and also get incorporated with them into the matrix. However, when sodium hydroxide alone is used without sodium silicate then the silicate and aluminate species from the raw materials are first dissolved by reaction with alkali and water leading to a relatively slow release of silicates and aluminates which are necessary to finally form the geopolymeric matrix. The drawbacks are that the process requires sodium silicate to be added externally.

Reference may be made to the article—Synthesis of pentacoordinate silicon complexes from $SiO_2$, Richard M. Laine, Kay Youngdahl Blohowiak, Timothy R. Robinson, Martin L. Hoppe, Paola Nardi, Jeffrey Kampf & Jackie Uhm *Nature* 353, 642-644, 17 Oct. 1991, wherein synthesis of pentacoordinate silicon complexes are reported from silica gel, fused silica/s and, ethylene glycol and metal hydroxide. However, this process suffers from the drawback of using silica gel/fused silica and ethylene glycol which are costly and are added externally.

Reference may be made to the article—Penta- and hexa-coordinate silicon mixed dichelates with the $SiC_2O_2N(Cl)$ ligand environment, Irina Kalikhman, Boris Gostevskii, Vadim Pestunovich, Nikolaus Kocher, Dietmar Stalke and Daniel Kosta, Arkivoc 2006 (v) 63-77 wherein it is reported that hexa and penta coordinated complexes exhibit remarkable chemical flexibility and have been prepared from chlorine containing ligands. However, the drawbacks of the process are that it involves use of chlorinated compounds which are corrosive in nature.

Reference may be made to the article-Influence of C12A7 admixture on setting properties of fly ash geopolymer, Pavel Rovnaník, Ceramics—Silikáty 54 (4) 362-367 (2010) wherein fly ash based geopolymers were prepared using externally added sodium silicate as an alkali activator. The structure of geopolymer gel was mainly amorphous and the aluminum was present in hexacoordinated state. However, the drawback of the process is the addition of sodium silicate externally.

Reference may be made to the article—Understanding the relationship between geopolymer composition, microstructure and mechanical properties, Peter Duxson, John L Provis, Grant C Lukey, Seth W Mallicoat, Waltraud M Kriven, Jannie S J Van Deventer, Colloids and Surfaces A Physicochemical and Engineering Aspects (2005), Volume: 269, Issue: 1-3, Pages: 47-58 wherein it is reported that the Si/Al ratio plays an important role in determining the properties of the geopolymeric matrix. The properties depend on the microstructure of the matrix rather than simply on compositional characteristics. The geopolymer materials were prepared using alkaline activator solution possessing high concentration of soluble silicon which results in an increase in viscosity and limits its dispersion and chemical reactions with other raw materials and therefore the significant quantity of other raw material e.g. fly ash remains unreacted in the geopolymeric matrix and as a consequence this results in a decrease in the strength of the geopolymeric matrix. This process suffers from the drawback of limited dispersion and hindered chemical reactions of the activating solution and also its external addition.

Reference may be made to the article—Polymerization in sodium silicate solutions: a fundamental process in geopolymerization technology D. Dimas, I. Giannopoulou and D. Panias, J. Mater Sci. 2009, 44, 3719-3730, wherein it is reported that among the various raw materials used for making geopolymers the cost of sodium silicate solution determines the economic feasibility of the geopolymeric system. Additionally, the techno-economic feasibility of making geopolymers can be improved either by reducing the quantity of sodium silicate required or by developing novel compositions based on elements namely boron, Aluminum, Phosphorous along with transition metals namely iron, chromium and nickel etc. as these elements can provide gelatinous binder structures similar to that of sodium silicate. However, the drawbacks that this process suffers from are the limited dispersion and hindered chemical reactions of the activating solution and also it is added externally.

It is noted that the conventional process of making sodium silicate is highly energy intensive, as the sodium silicate is obtained by reacting silica containing compounds namely quartz/glass culets etc. with alkali carbonate and bicarbonate in the temperature range of 1100-1200° C. and at elevated pressure. However, this process generates considerable quantity of green house gas namely $CO_2$ which is responsible for global warming problem and is energy intensive.

Reference may be made to the article—Nanocellulose from rice husk following alkaline treatment to remove silica. Leandro Ludueña; Diana Fasce; Vera Alvarez; Pablo Stefani, BIORESOURCES, 2011 vol. 6 (2) p. 1440-1453, wherein it is reported that multiple alkaline and acidic treatments of rice husk are required to obtain a variety of valuable products such as nano cellulose fibers, lignin, hemicelluloses and silica. However, the drawbacks that this process suffers from are the limited dispersion and hindered chemical reactions of the activating solution and also it needs to be added externally. Further, the process requires multiple treatments of the rice husk for obtaining various valuable materials.

Reference may be made to U.S. Pat. No. 4,964,995 wherein it is reported that, the application of kraft processes helps in extracting the lignocellulosic material from various fibers/materials using sodium hydroxide/sulfide solutions. However, the drawbacks that this process suffers from are the limited dispersion and hindered chemical reactions of the activating solution and also it needs to be added externally. Further, the process utilizes sulphide containing chemicals which are harmful in developing geopolymeric materials.

Further it is pertinent here to mention that use of rice husk ash as silica source for making geopolymeric materials has been widely reported by several workers. On the contrary, very limited use of "rice husk as such" and that to as mere reinforced material in geopolymeric matrix has been mentioned in the literature.

Reference may be made to the article—Silica Derived from Burned Rice Hulls, M. F. de Souza, W. L. E. Magalhaes, M. C. Persegil, Material Research, vol. 5, No. 4, 467-474, 2002, wherein it is reported that silica has been obtained from rice hulls by burning at elevated temperatures. The drawbacks that this process suffers from are the limited dispersion and hindered chemical reactions of the activating solution and that it needs to be added externally. Further, it is an energy intensive process and liberates green house gas namely $CO_2$.

Reference may be made to US 20110271876, wherein it is reported that geopolymeric materials were prepared from rice husk ash, blast furnace slag, bauxite, alumina slag or tailings, or powdered alumina oxide, dry sodium silicate or sodium silicate premixed with water or dry potassium silicate or potassium silicate mixed with water. The drawbacks that this process suffers from are the limited dispersion and hindered chemical reactions of the activating solution and that it needs to be added externally. Moreover, the process involves burning of rice husk to obtain rice husk ash which consumes energy and generates $CO_2$.

Reference may be made to the article—A novel mesoporous lignin/silica hybrid from rice husk produced by a sol-gel method Yuning Qu, Yumei Tian, Bo Zou, Jian Zhang, Yunhui Zheng, Lili Wang, Ying Li, Chunguang Rong, Zichen Wang, Bioresource Technology, Volume 101, Issue 21, November 2010, Pages 8402-8405, wherein reported are mesoporous lignin/silica hybrid prepared from rice husks using $H_2SO_4$ which separates lignin and silica and results in the formation of composite of lignin in silica powder. Nevertheless, the drawbacks are that this process suffers from the limited dispersion and hindered chemical reactions of the activating solution and also it needs to be added externally. Further, the lignin/silica hybrid material contains silica powder separately and the use of sulfuric acid dehydrates the organic species.

Reference may be made to U.S. Pat. No. 5,244,726, wherein a foamed composite is prepared by using alkali metal silicate-based activator, flyash, sodium laurel sulfate which contains dispersed inorganic particulates, organic particulates, or mixed inorganic and organic particulates from the group consisting of expanded polystyrene beads and polyethylene tetra phthalate polyester chopped fibers. However, the drawbacks that this process suffers from are the external addition and limited dispersion and hindered chemical reactions of the activating solution. In addition, the process uses alkali metal silicate-based activator (sodium silicate), polystyrene beads and polyethylene terephthalate polyester chopped fibers possessing very less compatibility with geopolymeric matrix. It is also reported that the process uses rice husk as a mere dispersed phase component to utilize its reinforcing characteristics only.

Reference may be made to the article—Fly Ash Porous Material using Geopolymerization Process for High Temperature Exposure, Mohd Mustafa Al Bakri Abdullah, Liyana Jamaludin, Kamarudin Hussin, Mohamed Bnhussain, Che Mohd Ruzaidi Ghazali and Mohd Izzat Ahmad, *Int. J. Mol. Sci.* 2012, 13, 4388-4395, wherein porous geopolymeric material has been prepared from fly ash, alkali activator, sodium hydroxide, aluminium powder and hydrogen peroxide. It was observed that the strength of the geopolymeric matrix increases as a result of heat treatment. However, the drawbacks that this process suffers from are the external addition and limited dispersion and hindered chemical reactions of the activating solution.

Reference may be made to the article—Mechanical and microstructural properties of alkali-activated fly ash geopolymers, by M Komljenović, Z Bascarević, V Bradić, Journal of Hazardous Materials (2010), Volume: 181, Issue: 1-3, Publisher: Elsevier, Pages: 35-42, wherein properties of geopolymer obtained by alkali-activation of fly ash (FA), using aqueous solutions of Ca(OH)(2), NaOH, NaOH+Na(2)CO(3), KOH and sodium silicate (water glass) of various concentrations as alkali activators have been described. The drawbacks are the external addition as well as limited dispersion and hindered chemical reactions of the activating solution.

Reference may be made to the article—Alkali Activated Fly Ash: Effect of Admixtures on Paste Rheology, M Criado, A Palomo, Ana Fernandez-Jiménez, P F G Banfill, Rheologica Acta (2009) Volume: 48, Issue: 4, Pages: 447-455, wherein recited is the conventional practice of utilization of organic species containing chemical admixture as water reducing agent for cement-concrete system. The process aims to achieve primarily, reduction in the water cement ratio to improve mechanical strength and secondarily to increase workability, reduce segregation, decrease permeability etc. Further, the salts of lignosulphonic acid or lignin provide excellent water reduction and produce good strength characteristics in conventional cementitious concrete systems. The conventional admixtures are used as external additives in minor amounts to improve the characteristics of cement-concrete matrix. The basic action of this admixture is to reduce water requirement in cementitious materials. However, it is important here to note that the characteristic of admixtures is not useful for geopolymeric systems as water is liberated during geopolymerisation and it does not require water for curing. Moreover, the disadvantages of this process are the limited dispersion and hindered chemical reactions of the externally added activating solution and that these organic containing admixtures are not workable in geopolymeric systems due to high alkaline environment.

Reference may be made to US 20110284223, wherein it is reported that organic compounds containing at least one nitrogen atoms such as lignin amine have been used as chemical admixtures and are suitable as a retarder in geopolymeric compositions. However, the drawbacks are that the activating solution needs to be added externally coupled to its limited dispersion and hindered chemical reactions. Further, the organic compounds containing nitrogen atoms are used externally and as mere retarders in geopolymeric systems which helps only in improving their setting time and workability etc. These compounds are not at all essentially a part of the basic reaction mixture required for making conventional geopolymeric materials.

From the hitherto reported prior art and based on the drawbacks of the conventional processes, the various issues that need to be addressed and problems to be solved are summarized here as under. The last two decades have witnessed significant achievements in the area of making advanced multifunctional geopolymeric materials and one of them is the development of inorganic geopolymeric materials. However, the development of this unique technology suffers from the following drawbacks:

1. Firstly, the work so far carried out in the area of development of geopolymeric materials is basically restricted and is essentially based on "inorganic polymeric materials" only.

2. Secondly, the most important and primary reactant required for making geopolymeric materials namely sodium silicate (activator/activating solution), possesses only "inorganic frame work" which sterically hinders its chemical reactivity with various constituents of the other raw materials. Further, when added externally, its limited dispersion and chemical reaction leads to the segregation of various phases in the matrix and thus results in a non-homogeneous matrix exhibiting poor geopolymeric characteristics.

3. The functionality of the conventional geopolymeric materials is limited as basically they are an Inorganic matrix.

4. The sodium silicate used in making the conventional geopolymeric materials is the costliest constituent among all the raw materials necessary for making geopolymeric materials; as the conventional process of making sodium silicate is highly energy intensive because the sodium silicate is obtained by reacting silica containing compound namely quartz/glass culets etc. with alkali carbonate and bicarbonate in the temperature range of 1100-1200° C. at elevated pressure. Another drawback of the process of making sodium silicate is the generation of green house gas namely $CO_2$ responsible for global warming problem.

5. The silica derived from burning of rice husk has been utilized in some of the literature reports for making geopolymers. However during the burning process, the amorphous silica is substantially converted to less reactive crystalline phase and is associated with un-burnt carbon as impurity. Further, during the burning process $CO_2$ is generated.

6. Some of the conventional processes of making advanced geopolymeric composites use rice husk as a mere dispersed phase component to utilize its reinforcing characteristics.

OBJECTS OF THE INVENTION

The main object of the present invention is thus to provide a composition for making advanced hybrid geopolymeric functional materials which obviates the drawbacks of the hitherto known prior art as detailed above.

Another object of the invention is to provide a process for the preparation of the said geopolymeric materials based on hybrid organic-inorganic precursors from industrial and agricultural waste and also from pure compounds.

Still another object of the invention is to provide an organic-inorganic frame work of sodium silicate by its in-situ synthesis in the presence of organic species namely lignin, cellulose, hemicelluloses and their alkali derivatives etc.

Yet another object of the invention is to provide a highly energy efficient process for making sodium silicate in-situ by reacting siliceous phases obtained from raw materials consisting of industrial and agricultural waste and pure compounds with strong alkaline aqueous solution at ambient temperature and to avoid the generation of greenhouse gas mainly $CO_2$.

Still another object of the present invention is to utilize the amorphous silica present in rice husk and totally avoid the burning of rice husk.

Yet another object of the present invention is to utilize rice husk as a major reactant of the geopolymerisation process and provide extraction of organic and inorganic hybrid precursors therefrom.

SUMMARY OF THE INVENTION

The present invention provides a composition for advanced hybrid geopolymeric functional materials and a process for the preparation thereof. The developed process generates sodium silicate and various organic and inorganic moieties in-situ by together grinding of appropriate selective raw materials and designing synergistic and simultaneous chemical reactions among various reactants generated by alkali activation of industrial and agricultural waste. This helps in avoiding the addition of sodium silicate externally which is the costliest ingredient used in the conventional geopolymeric processes. The process of the present invention involves in-situ synthesis of sodium silicate by alkali treatment of rice husk which is one of the primary reactant of the present process and thus obviates the need of adding sodium silicate externally. The alkali treatment of rice husk simultaneously enables obtaining various organic species namely lignin, cellulose, hemicelluloses and their alkali derivatives along with sodium silicate. The appropriate chemical linkages of this in-situ formed sodium silicate species with these organic species helps in converting the conventional inorganic frame work of sodium silicate into the hybrid inorganic-organic frame work which enhances the dispersion as well as the chemical reaction of in situ synthesized sodium silicate with other raw materials of the geopolymeric matrix. Thus the process enables the preparation of geopolymeric materials with improved characteristics and functionality.

Accordingly, the present invention provides a composition for advanced hybrid geopolymeric functional materials which comprises [a] inorganic industrial waste containing Si, Al, B, P, N, Na, K, Ca, Mg elements; [b] NaOH; and [c] agricultural waste having C1 to C2 aliphatic molecules, C9 to C11 aromatic molecule and C4 to C6 cyclic organic moieties; and wherein the ratio of [a]:[b]:[c] is in the range of 0.5 to 1.0:0.1 to 0.4:0.1 to 0.2.

In an embodiment, the present invention provides a composition for advanced hybrid geopolymeric functional materials which comprises [a] inorganic industrial waste containing Si, Al, B, P, N, Na, K, Ca, Mg elements [b] NaOH, and [c] agricultural waste materials capable of providing C1 to C2 aliphatic molecules like ethylene glycol, aromatic molecule like lignin having molecular formula $C_9H_{10}O_2, C_{10}H_{12}O_3, C_{11}H_{14}O_4$ and cyclic organic moieties like cellulose [molecular formula $(C_6H_{10}O_5)n$], hemicelluloses composed of xylose, mannose, glucose and lactose and having shorter chains of 500 to 3000 sugar units.

In another embodiment of the present invention, the composition contains [a] fly ash [b] NaOH and [c] rice husk in the ratio of [a]:[b]:[c] in the range of 0.5 to 1.0:0.1 to 0.4:0.1 to 0.2.

In still another embodiment of the present invention, the composition contains [a] fly ash [b] NaOH [c] rice husk and [d] rock phosphate and are the ratio of [a]:[b]:[c]:[d] is in the range of 1.0 to 2.0:0.96 to 1.0:0.28 to 0.30:0.14 to 0.20.

In yet another embodiment of the present invention, the hybrid organic-inorganic precursors required for making geopolymeric materials can be obtained from any organic materials capable of providing organic materials capable of providing C1 to C2 aliphatic molecules like ethylene glycol, aromatic molecule like lignin having molecular formula $C_9H_{10}O_2, C_{10}H_{12}O_3, C_{11}H_{14}O_4$ and cyclic organic moieties like cellulose [molecular formula $(C_6H_{10}O_5)n$], hemicelluloses composed of xylose, mannose, glucose and lactose and having shorter chains of 500 to 3000 sugar units and inorganic moieties containing Si, Al, B, P, N, Na, K, Ca, Mg elements.

In another embodiment of the present invention, the various inorganic industrial wastes that can be used are all the waste materials used in conventional geopolymeric process and additionally include siliceous rock phosphates.

In still another embodiment of the present invention, the inorganic industrial waste is fly ash.

In yet another embodiment of the present invention, the various organic agricultural wastes that can be used are all the wastes and materials already used in conventional geopolymeric process and additionally include rice husk and straw of paddy and wheat, sisal fibers, soya fibers and other vegetation products.

In still another embodiment of the present invention, the organic agricultural waste is rice husk.

In another embodiment, the present provides the use of appropriate materials viz. organic agricultural wastes capable of providing C1 to C2 aliphatic molecules like ethylene glycol, aromatic molecule like lignin having molecular formula $C_9H_{10}O_2, C_{10}H_{12}O_3, C_{11}H_{14}O_4$ and cyclic organic moieties like cellulose [molecular formula $(C_6H_{10}O_5)n$], hemicelluloses composed of xylose, mannose, glucose and lactose and having shorter chains of 500 to 3000 sugar units containing organic species to obtain hypervalent silico-aluminous complexes (e.g., penta, coordinates silicon complexes and tetra and hexa coordinated aluminum complexes simultaneously) since these characteristics provide advanced functionality to the prepared geopolymeric materials.

In yet another embodiment, the present invention provides a process for making advanced hybrid geopolymeric functional materials which comprises together crushing and grinding of raw materials such as fly ash with rice husk or fly ash with siliceous rock phosphate and rice husk using ball mill or advanced machinery such as planetary mill, for a period ranging from 1-7 hours. The dry mix so obtained is then fractionated using standard sieves to obtain fractions of sizes up to 100 microns. The various factions are then reacted with aqueous sodium hydroxide solution of concentrations ranging from 7-17 molar in the temperature range of ambient to 200° C. for a period of 10 to 60 minutes. In case of microwave heating, the duration of exposure of microwave is in the range of 10 minutes to 30 minutes with a power range of 5 to 1200 watts. The mixture so obtained after reaction with sodium hydroxide solution, is used for making geopolymeric samples in the form of cubes and tiles for evaluating physico-mechanical and cementitious characteristics using standard practices. The geopolymeric samples were obtained with the desired functionality in the materials e.g. a) cementitious materials with density ranging from 1.2 to 2.7 gm/cm$^3$, b) porous matrix useful for insulation with density ranging from 1.1 to 1.2 gm/cm$^3$.

In still another embodiment of the present invention, the grinding and crushing of the raw materials mix is carried out using conventional as well as advanced machinery in dry as well as wet conditions.

In yet another embodiment of the present invention, the reaction of NaOH solution with grinded and crushed raw materials mix is carried out at ambient temperature and at elevated temperature using thermal as well as by microwave energy.

In still another embodiment of the present invention, the curing of the geopolymeric samples is carried out at ambient or elevated temperatures using thermal as well as by microwave energy.

In yet another embodiment of the present invention, the geopolymeric samples can be treated at ambient or elevated temperatures using thermal as well as microwave energy to obtain the desired functionality in the materials e.g., a) cementitious materials, or b) porous insulating materials.

In still another embodiment, the present invention provides a process wherein the geopolymeric materials have been developed based on "hybrid organic-inorganic precursors" utilizing inorganic, industrial and agricultural wastes as well as from pure materials.

In yet another embodiment, the present invention provides a process wherein the sodium silicate has been synthesized in-situ by reacting siliceous phases generated from thoroughly grinded raw materials consisting of inorganic, industrial and agricultural wastes along with strong alkaline aqueous solution at ambient temperature. This in-situ synthesis of sodium silicate also avoids the generation of greenhouse gases mainly $CO_2$.

In still another embodiment, the present invention provides a process wherein the sodium silicate has been synthesized in-situ in the presences of organic species namely lignin, cellulose, hemicelluloses and their alkali derivatives etc. which enables the appropriate chemical linkages of this in-situ formed sodium silicate species with all the other inorganic and organic species/reactants simultaneously and synergistically via the formation of hybrid species of lignin, cellulose, hemicelluloses with silicate and aluminates etc. All these molecular moieties are necessarily required for making advanced "hybrid polymeric" substrate materials. The presence of these organic species modifies the linkages of sodium silicates enabling improved chemical reaction among various raw materials used for making geopolymeric materials.

In yet another embodiment the present invention provides a process wherein, the rice husk is used as a reactant of the geopolymerisation process involving its crushing and grinding simultaneously with other raw materials, which enables in-situ synthesis of sodium silicate in the presences of organic species namely lignin, cellulose, hemicelluloses and their alkali derivatives etc. This obviates the steric hindrance among various reacting species.

In another embodiment, the present invention provides a process wherein the silicon containing precursors necessary for in situ synthesis of sodium silicate are obtained from the grinding and crushing of the silico aluminates phases containing raw materials e.g. fly ash and agricultural waste e.g. rice husk respectively at room temperature in a ball mill. The material so obtained was fractionated using standard sieves to collect different fractions based on particle sizes. All the fractions were found to possess different mineralogical and chemical compositions. The various fractions obtained were treated with aqueous solution of sodium hydroxide alone of different concentrations for alkaline hydrolysis. The solution used for alkaline hydrolysis essentially does not contain externally added sodium silicate as otherwise used in conventional geopolymerisation reactions. During the alkaline hydrolysis of different fractions of raw materials, the sodium silicate has been synthesized in-situ in the presences of organic species namely lignin, cellulose, hemicelluloses and their alkali derivatives etc., Lignin are dissolved and hemicelluloses are degraded to a complex mixture of organic compounds including various carboxylic acids such as saccharine acids. Low molecular weight components such as phenolic compounds derived from lignin are present in alkaline solutions. This enables the appropriate chemical linkages of this in-situ formed sodium silicate species with all the other inorganic and organic species/reactants simultaneously and synergistically via the formation of hybrid species of lignin, cellulose, hemicelluloses with silicate and aluminates etc.

In yet another embodiment, the present invention provides a process wherein the mixture of well grinded raw materials, after curing with conventional heating followed by ageing using microwave radiation for 28 minutes imparts strength comparable with ageing for 28 days at ambient temperatures. Thus the use of microwave substantially reduces the ageing time for imparting strength in geopolymers.

DETAILED DESCRIPTION OF THE INVENTION

The terms 'ambient temperature' and 'elevated temperature' as recited in the specification refer to temperatures in the range of 24 to 40° C. and 80 to 200° C. respectively.

The present invention provides a composition for advanced hybrid geopolymeric functional materials wherein the "inorganic framework of sodium silicate" has been converted into "organic-inorganic frame work" by its in-situ synthesis in the presence of organic species namely lignin, cellulose, hemicelluloses and their alkali derivatives etc., derived from grinding and crushing of industrial and agricultural wastes simultaneously followed by their reaction with strong alkaline aqueous solution. This enables the appropriate chemical linkages of this in-situ formed sodium silicate species with all the other inorganic and organic species/reactants simultaneously and synergistically via the formation of hybrid species of lignin, cellulose, and hemicelluloses with silicate and aluminates etc. The presence of these organic species modifies the linkages of sodium silicates with silica/alumina bearing species leading to improved chemical reactions among various raw materials used for making geopolymeric materials. This facilitates the formation of a homogeneous continuous matrix thus resulting in improved geopolymeric properties and enhanced functionality in the developed material.

The process for making the said advanced hybrid geopolymeric functional materials involves together crushing and grinding of raw materials such as an [a] inorganic industrial waste containing silicon and aluminum [b] NaOH, and [c] agricultural waste having C1 to C2 aliphatic molecules, C9 to C11 aromatic molecule and C4 to C6 cyclic organic moieties, wherein the ratio of [a]:[b]:[c] is in the range of 0.5 to 1.0:0.1 to 0.4:0.1 to 0.2 using ball mill or advanced machinery such as planetary mill, for a period ranging from 1-7 hours to obtain a dry mix, which is then fractionated using standard sieves to obtain fractions of size in the range up to 100 microns. The various factions are then reacted with aqueous sodium hydroxide solution of concentration ranging from 7-17 molar so as to obtain ratio of silica to sodium oxide in the range of 3 to 3.5:1 to 1.5, at a temperature in the range of 24 to 200° C. for a period of 10 to 60 minutes. In the case of microwave heating, the duration of exposure of microwave is in the range of 10 minutes to 30 minutes at power in the range of 5 to 1200 watts. The mixture so obtained after reaction with sodium hydroxide solution, is used for making geopolymeric samples in the form of cubes and/or tiles for evaluating the physico-mechanical and cementitious characteristics using standard practices. The geopolymeric samples were then heat treated at ambient temperature and elevated temperatures by thermal as well as by microwave radiations to obtain the desired functionality in the materials e.g. a) cementatious materials with density ranging from 1.2 to 2.7 $gm/cm^3$, OR b) porous matrix useful for insulation with density ranging from 1.1 to 1.2 $gm/cm^3$.

The invented process of the present invention:

a) obviates the need of externally added essential constituent viz., sodium silicate, which is required to be added in the conventional processes. The sodium silicates are among the costliest raw materials used in making such geopolymers.

b) enables in-situ synthesis of sodium silicates along with all the other organic and in-organic species/reactants required for converting conventional "inorganic frame work of sodium silicate" to "Inorganic-organic hybrid frame work" which specially possesses appropriate chemical linkages, thus enabling the increased dispersion and enhanced chemical reaction of the in-situ formed sodium silicate with all the other reactants of geopolymeric matrix simultaneously and synergistically. The appropriate chemical linkages of this in-situ formed sodium silicate species are necessarily required in the formation of the precursor needed for making advanced hybrid geopolymeric functional materials.

EXAMPLES

The following examples are given by way of illustration of the working of the invention in actual practice and therefore should not be construed to limit the scope of the present invention.

Example 1

For making a geopolymeric sample 550 gm of fly ash, and 100 gm of rice husk together were dry ground and crushed using a ball mill. The material obtained after grinding was fractionized and then the fraction containing (−45 to +75) micron fraction micron size powder was reacted with 250 ml of 12.5 molar sodium hydroxide solution. To test the cementitious properties of this geopolymeric material, the standard cube of size 70.6 mm×70.6 mm×70.6 mm, were casted and cured in an air oven at 60° C. for 24 hours duration. Thereafter, the samples were removed from the air oven and aged at ambient temperature for 3 and 7 days. The samples so obtained were tested for their compressive strength using Aimil Make hydraulic compressive testing machine. The samples were found to posses compressive strength in the range of 10-12 MPa for samples aged for 3 days samples and 15-20 MPa for samples aged for 7 days.

Example 2

For making geopolymeric material of another composition, 550 gm fly ash, and 500 gm rice husk were together dry ground and crushed using a ball mill and fractionated. The (−45 to +75) micron fraction and were then reacted with 1250 ml of 12.5 molar sodium hydroxide solution. To test the cementitious properties of the geopolymeric material so obtained, the standard cube of size 70.6 mm×70.6 mm×70.6 mm were casted and cured in an air oven at 60° C. for 24 hours duration. Then the samples were aged at ambient temperature for 28 days. Thereafter, the samples were tested for their compressive strength using Aimil Make hydraulic compressive testing machine. The compressive strength was found to be in the range of 20-25 MPa.

Example 3

To evaluate the effect of microwave radiation on curing of geopolymeric materials, 550 gm of fly ash and 50 gm rice husk were together dry ground and crushed using a ball mill and fractionated. 300 gm of (−45 to +75) micron fraction was then reacted with 250 ml of 12.5 molar sodium hydroxide. To test the cementitious properties of this geopolymeric material, standard cube of size 70.6 mm×70.6 mm×70.6 mm were casted and cured in an air oven at 60° C. for 24 hours. The samples were then aged in a microwave oven for 28 minutes at 240 watts. The samples were removed from the microwave oven and were tested for their compressive strength using Aimil Make hydraulic compressive testing machine. The compressive strength was found to be in the range of 33-35 MPa.

Example 4

For making geopolymeric sample of another composition, 3 kg fly ash and 1 kg of rice husk were together dry grounded and crushed using a ball mill and fractionized. 2 Kg powder of (−45 to +75) micron fraction was reacted with one liter of 15 molar sodium hydroxide solution at ambient temperature. The material so obtained was casted using the standard cube of size 70.6 mm×70.6 mm×70.6 mm, and cured at for 24 hours at 60° C. and then aged at ambient temperature for 7 and 28 days followed by evaluation of their compression strength using Aimil Make hydraulic compressive testing machine. The samples were observed to possess compressive strength of 10 and 22 MPa for aging of 7 and 28 days respectively.

Example 5

For making geopolymeric material of another composition, 700 gm fly ash, 100 gms of siliceous rock phosphate and 200 gm rice husk were together dry ground and crushed using a ball mill and fractionated. The (−45 to +75) micron fraction and were then reacted with 1300 ml of 13 molar sodium hydroxide solution. To test the cementitious properties of the geopolymeric material so obtained, the standard cube of size 70.6 mm×70.6 mm×70.6 mm, were casted and cured in an air oven at 60° C. for 24 hours duration. Then the samples were aged at ambient temperature for 28 days. Thereafter the samples were tested for their compressive strength using Aimil Make hydraulic compressive testing machine. The compressive strength was found to be in the range of 20-22 MPa.

Example 6

For imparting functionality to the geopolymer, preparation of porous material was carried out. For this purpose 3 kg fly ash and 1 kg of rice husk were together dry grounded and crushed using a ball mill and fractionized. 2 Kg powder of (−45 to +75) micron fraction was reacted with one liter of 15 molar sodium hydroxide solution. The material so obtained was casted using the standard cube of size 70.6 mm×70.6 mm×70.6 mm, and cured at for 24 hours at 60° C. and then aged at ambient temperature for 28 days followed by heating at 800° C. for one hour. The sample showed 35% porosity and had density in the range of 1.1 to 1.2 gm/cm$^3$ which may be useful for heat insulation applications.

Advantages of The Invention

The main advantages of the present invention are:

It expands application spectrum of geopolymeric materials for making advanced functional materials due to presence of organic-inorganic moieties simultaneously in the geopolymeric matrix.

The change of inorganic frame work of sodium silicate to organic-inorganic frame work enables in obtaining homogeneous geopolymeric matrix with improved characteristics due to increased extent of dispersion of siliceous and alkaline species responsible for increased chemical reaction among the raw materials thus enabling to obtain increased quantity of geopolymeric binders.

The hybrid organic-inorganic precursors required for making geopolymeric materials can be obtained from any organic materials cable of providing preferably long chain aliphatic, aromatic and cyclic organic moieties and inorganic moieties containing Si, Al, B, P, N, Na, K, Ca, Mg' elements.

Apart from costly pure materials, any industrial and agricultural waste essentially providing the desired organic and inorganic species can be used for making hybrid organic-inorganic precursors required for making geopolymeric materials.

The simultaneous mechano-chemical processing of raw materials is advantageous as it enables to obtain in-situ, maximum concentration of all the required organic and inorganic moieties from raw materials for obtaining hybrid organic-inorganic precursors for making geopolymeric materials.

The present process is advantageous as it enables the organic moieties as essential primary reactant in obtaining desired basic inorganic-organic hybrid framework necessary for making geopolymeric matrix in contrast to the limited role of organic species containing admixtures used in conventional cementitious and geopolymeric materials in improving their setting time and workability etc.

The present process is advantageous as it is highly energy efficient and economic process for making sodium silicate in-situ at ambient temperature and helps in overcoming the problems encountered due to evolution of $CO_2$ in the commercial process of making sodium silicate.

The present process enables extraction of amorphous silica present in the rice husk at room temperature which is otherwise extracted from rice husk by thermal treatment at higher temperatures.

The developed process is advantageous as it enables to tailor the functionalities by designing appropriate chemical and thermal treatment using conventional as well as microwave radiation of developed hybrid inorganic-organic materials e.g., a) cementatious materials and/or b) porous materials for thermal insulating applications.

What is claimed is:

1. A process for making a hybrid geopolymeric functional material comprising the steps of:
    crushing and grinding fly ash containing Si and Al, and crushing and grinding rice husks;
    reacting at a temperature of from 24° C. to 200° C.
        a) said ground inorganic fly ash containing Si and Al;
        b) aqueous sodium hydroxide; and
        c) said ground rice husk;
        wherein the ratio of a):b):c) is 0.5 to 1.0: 0.1 to 0.4: 0.1 to 0.2;
        said reaction producing insitu sodium silicate, and converting said rice husk organic compounds to lignin, cellulose, or hemicellulose species, or any combination thereof; reacting said sodium silicate with said inorganic compounds and said rice husk species and forming chemical linkages of said sodium silicate with said fly ash and said rice husk species and producing a hybrid inorganic-organic geopolymer functional material; and
    wherein said reactants are free of rice husk ash.

2. The process of claim 1, wherein the crushing or grinding time is from 1 to 7 hours and obtaining a dry mix.

3. The process of claim 2, including fractionating said mix into fractions having a particle size of from −45 to −75 microns.

4. The process of claim 1, wherein the concentration of aqueous sodium hydroxide solution is 7 to 17 molar.

5. The process of claim 1, wherein the said hybrid geopolymer material is further heated at a temperature of 400° C. to obtain porous matrices useful for insulation having density ranging from 1.1 to 1.2 gm/cm$^3$.

6. A composition of a hybrid geopolymeric functional material comprising:
    ground inorganic fly ash containing Si and Al and ground rice husk reacted with sodium hydroxide, said reaction producing sodium silicate in situ, and lignin, cellulose, and hemicellulose from said ground rice husk;
    said sodium silicate reacted with said fly ash containing Si and Al and reacted with said cellulose, hemicellulose, or lignin, to form chemical linkages of said sodium silicate with said fly ash and said cellulose, hemicellulose, or lignin to produce said hybrid geopolymeric functional material.

7. The composition of claim 6, wherein said ground inorganic fly ash and said ground rice husk have a particle size of from −45 to +75 microns.

8. The composition of claim 7, wherein the concentration of said sodium hydroxide is from 7 to 17 molar.

9. The composition of claim 6, wherein said reaction with sodium hydroxide provides Sucrose ($C_{12}H_{22}O_{11}$), a D-Glucose ($C_6H_{12}O_6$), Native cellulose ($C_6H_{12}O_6$)$_x$ and phenol ($C_6H_6O_5$).

10. The composition of claim 6, wherein said hybrid geopolymeric functional material has a density of 1.1 to 1.2 grams per cubic centimeter.

11. An insulation material comprising the hybrid geopolymeric functional material of claim 10.

* * * * *

UNITED STATES PATENT AND TRADEMARK OFFICE
CERTIFICATE OF CORRECTION

| | |
|---|---|
| PATENT NO. | : 9,120,701 B2 |
| APPLICATION NO. | : 13/949585 |
| DATED | : September 1, 2015 |
| INVENTOR(S) | : Sudhir Sitaram Amritphale et al. |

It is certified that error appears in the above-identified patent and that said Letters Patent is hereby corrected as shown below:

In the Claims

In column 14, claim 3, line 11, please replace "-75 microns" with --+75 microns--

In column 14, claim 4, line 14, please replace "solution is 7 to" with --solution is from 7 to--

In column 14, claim 5, lines 15-16, please replace "hybrid geopolymer material is" with --hybrid geopolymer functional material is--

Signed and Sealed this
Twelfth Day of July, 2016

Michelle K. Lee
*Director of the United States Patent and Trademark Office*